(No Model.)
D. C. McNAUGHTON.
METHOD OF PROTECTING DENTAL FILLINGS.
No. 400,585. Patented Apr. 2, 1889.
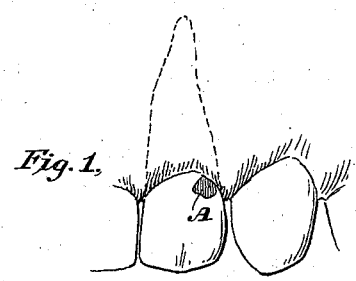
Fig. 1,
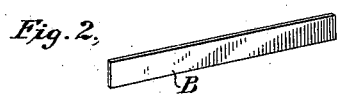
Fig. 2,
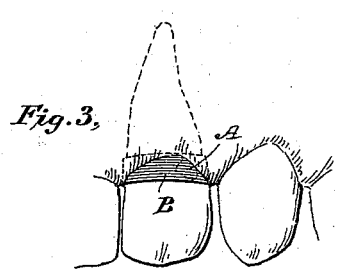
Fig. 3,
Witnesses
Geo. W. Breck.
Malcolm McNaughton
Inventor,
Daniel C. McNaughton

UNITED STATES PATENT OFFICE.

DANIEL C. McNAUGHTON, OF JERSEY CITY, NEW JERSEY.

METHOD OF PROTECTING DENTAL FILLINGS.

SPECIFICATION forming part of Letters Patent No. 400,585, dated April 2, 1889.

Application filed August 3, 1887. Serial No. 246,060. (No model.)

*To all whom it may concern:*

Be it known that I, DANIEL C. McNAUGHTON, a citizen of the United States, residing at Jersey City, county of Hudson, State of New Jersey, have invented a new and useful Method of Protecting Teeth and Arresting Decay; and I do hereby declare the following to be a full and clear description of my invention, which will enable others skilled in the art to which it appertains to make use of the same.

My invention relates to a method of arresting decay and preventing sensitiveness of teeth and preserving the same by first removing any decay, then applying suitable plastic or cement and banding the tooth with a strip or band having free ends and appropriate to permanently cover the required part of the tooth to protect it, all as hereinafter fully described, and then pointed out in the claim.

When the gum recedes from its normal position on the neck of the tooth, it exposes the delicate dentine, which becomes extremely sensitive and subject to rapid decay. Especially does the invention aim to protect such exposed dentine, which is by no means hardy, and to prevent and arrest decay thereof.

In order to prevent sensitiveness, several well-known methods have been resorted to, but they only afforded temporary relief and generally discolored the tooth. The heretofore-employed methods of arresting decay on the neck of the tooth, by removing the decay and filling the pit with either a precious metal—such as gold—or with a plastic, have not always been successful. These methods of filling necessitated comparatively deep cavities to afford retaining-walls for the fillings; and the heretofore-used plastic fillings would not wear well and were unsightly, and as gold required much time for insertion it was almost impossible to keep the cavity dry while filling it—a condition necessary for the permanency of such a filling.

By my improved method sensitiveness is permanently removed and the filling quickly accomplished, and since no retaining-walls are necessary a shallow pit can be filled as readily and reliably as a deeper one.

In carrying out the invention I apply a plastic, preferably, to the inner face of a band, which is made of suitable material to withstand the acids of the mouth and to wear well—such as gold, platina, or aluminium—and which is made of a width sufficient to cover or a little more than cover the breadth of the exposed area about the tooth or the excavated part thereof. I then place the band having free ends about the tooth, so as to cover the required area, and with the plastic interposed, and then draw it tightly about the tooth, and secure the band permanently in position by locking the ends thereof together in any suitable manner. The crown of the tooth may thus be entirely or in part exposed. Any of the plastics well known in dentistry may be used—such, for instance, as gutta-percha or mineral cement. The plastic is of course to be laid on thicker where the pit left by the removed decay is located, and it acts both as the filling therefor and a cushion for the band to prevent liquids from entering between the band and tooth, and it also serves to hold the band to the tooth. Where the sensitive surface of the neck of the tooth is to be covered and protected, it will be within the possibilities of the invention to use a plastic band that will closely fit about the tooth and adhere thereto, so as to cover the sensitive dentine. Of course the shape and dimensions of the band will depend upon the necessities of the particular case at hand.

In order that my invention may be fully understood, I have illustrated in the accompanying drawings a way in which my invention may be practically carried out, and in the same like letters of reference designate like and corresponding parts throughout.

In the said drawings, Figure 1 is a side view of a portion of a set of teeth, one of which has its outlines completed by broken lines, and is formed with a pit or cavity from which the decayed matter has been removed previous to filling and banding the tooth. Fig. 2 is a perspective of the band employed in the process. Fig. 3 shows the tooth after it has been filled and banded.

Referring to the drawings, suppose the gum has receded from the neck of the tooth having the dotted outlines and has exposed the dentine thereof. I protect this dentine and prevent sensitiveness and decay of the same by taking a suitable band having free ends—such as the band B—formed of the required width to cover the exposed area of the neck of the tooth and of a length great enough to encompass the neck, and which is made, preferably, of precious metal—such as gold—and after thinly lining the band with plastic I pass it about the tooth, so as to cover the desired area, as shown in Fig. 3. The band is then drawn tightly about the tooth and secured permanently in such position by locking the ends thereof together, which locking may obviously be done by folding the ends together, or perforating one and passing the other therethrough, or by securing tie-wires to the ends and twisting them together. Any preferred way of locking the ends of the band together may be adopted, since the invention does not pertain to such mechanical features.

Where decay has occurred on the neck of the tooth, I remove the same, as from A, and then fill the cavity and protect it by taking a band, as B, and lining it thinly with plastic, increasing the thickness of the layer at the point to be placed over the cavity, and then passing the band around the tooth, drawing it tightly about the same, and securing it permanently in position, so as to cover the cavity by fastening its free ends, as indicated in Fig. 3. The plastic is thus forced firmly into the cavity A as the ends of the band are drawn tightly together, and is also compactly and completely interposed between the band and tooth, so as to exclude liquids therefrom.

It is likely that different materials for banding the tooth, and also for cementing the same, may readily suggest themselves to those skilled in the art, but any such substitutions will manifestly be within the scope of my invention. I am enabled to permanently protect and preserve a tooth without affecting its natural contour, and to provide fillings that possess both the advantages of gold and plastic, without the disadvantages of either. As the free ends of the band are secured at the back of the tooth, and since there is no possibility of discoloring the tooth, the method provides a very neat and desirable way of protecting teeth.

Another important advantage is that, since no retaining-walls are necessary for the filling, only the decay need be removed, no matter how shallow a pit is left. On the other had, it often happens that with gold filling considerable undecayed matter has to be removed, in order to obtain the retaining-walls necessary for such a filling.

It will be especially noted that the method makes a most desirable way of protecting fillings when they lie at a point where the periphery of the tooth is less than the periphery at some other point farther away from the gum.

Having thus described my invention, what I claim, and desire to secure by Letters Patent, is—

The herein-described method of protecting a tooth and arresting decay without destroying the healthy part of the tooth, which consists in lining a band having free ends with a plastic or cement, passing said band about the part of the tooth to be protected, having previously removed any decay, and then drawing the band tightly in position and securing its free ends permanently together, the plastic or cement being interposed between the band and the tooth, substantially as hereinbefore set forth.

DANIEL C. McNAUGHTON.

Witnesses:
MALCOLM McNAUGHTON,
FREDERICK W. GIBBS.